United States Patent
McGraw et al.

(10) Patent No.: US 7,418,343 B1
(45) Date of Patent: Aug. 26, 2008

(54) RELATIVE NAVIGATION FOR PRECISION RENDEZVOUS AND STATION KEEPING USING DATALINK SIGNALS

(75) Inventors: Gary A. McGraw, Cedar Rapids, IA (US); Robert J. Frank, Cedar Rapids, IA (US); Kenneth M. Peterson, Marion, IA (US); Richard S. Haendel, Iowa City, IA (US); Scott J. F. Zogg, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 915 days.

(21) Appl. No.: 10/848,708

(22) Filed: May 19, 2004

(51) Int. Cl.
*G01S 1/08* (2006.01)

(52) U.S. Cl. .................... 701/300; 244/76 R

(58) Field of Classification Search ............ 701/4, 701/11, 226, 14, 222–223, 300–302; 244/76 R, 244/135 A, 3.16, 161; 250/203.1, 203.2, 250/322, 342, 208.1; 702/150
See application file for complete search history.

(56) References Cited

U.S. PATENT DOCUMENTS

| | | | |
|---|---|---|---|
| 3,336,591 A * | 8/1967 | Michnik et al. ............ 342/31 |
| 4,025,193 A * | 5/1977 | Pond et al. ............... 356/5.1 |
| 4,674,710 A * | 6/1987 | Rodriguez ............... 244/76 R |
| 4,814,994 A | 3/1989 | Doane et al. |
| 5,043,903 A * | 8/1991 | Constant ................ 701/300 |
| 6,072,433 A * | 6/2000 | Young et al. ............ 342/386 |
| 6,262,679 B1 * | 7/2001 | Tran ....................... 342/29 |
| 6,646,588 B2 * | 11/2003 | Tran ....................... 342/29 |

OTHER PUBLICATIONS

*JTIDS Relative Navigation and Data Registration* by Wayne W. Altrichter, Aerospace and Electronics Systems Magazine, IEEE, vol. 7 issue 6, Jun. 1992 pp. 42-50.

Patent Application for "Waveform for Virtually Simultaneous Transmission and Multiple Receptions System and Method" by Scott J. Zogg et al., U.S. Appl. No. 10/217,731, filed Aug. 13, 2002.

Patent Application for "Statistical Priority-Based Multiple Access System and Method" by Stephen M. Clark et al., U.S. Appl. No. 10/210,648, filed Jul. 31, 2002.

* cited by examiner

*Primary Examiner*—Dalena Tran
(74) *Attorney, Agent, or Firm*—Nathan O. Jensen

(57) ABSTRACT

A follower aircraft is guided to a lead aircraft using a datalink that determines range between the two. The lead aircraft has an antenna array and processing system for determining azimuth/elevation of the follower aircraft. The lead aircraft transmits a ranging message to the follower aircraft and stores a lead aircraft time of transmit (TOT) time. The ranging message is received at the follower aircraft and a follower aircraft time of reception (TOR) time is stored. A second ranging message is transmitted from the follower aircraft to the lead aircraft and a follower aircraft TOT time is stored. The second ranging message is received at the lead aircraft and a lead aircraft TOR is stored. A message is sent from the follower aircraft when follower aircraft TOT and TOR. The range and time offset is determined by the lead aircraft using follower aircraft TOT/TOR and stored lead aircraft TOT/TOR.

3 Claims, 8 Drawing Sheets

RELATIVE NAVIGATION FOR PRECISION RENDEZVOUS AND STATION KEEPING USING DATALINK SIGNALS

CROSS REFERENCE TO RELATED APPLICATIONS

The present application is related to co-pending applications Ser. No. 10/210,648 filed on Jul. 31, 2002 entitled "Statistical Priority-Based Multiple Access System and Method" by Stephen M. Clarl, Kelli A. Hoback, and Scott J. F. Zogg and to Ser. No. 10/217,731 entitled "Waveform for Virtually Simultaneous Transmission and Multiple Receptions System and Method" by Scott J. F. Zogg, Stephen M. Clark, Richard S. Haendel, Ronald R. Meyer, and Brian L. Aanderud. The co-pending applications are incorporated by reference herein in their entirety. All applications are assigned to the assignee of the present application.

BACKGROUND OF THE INVENTION

This invention relates to relative navigation, precision rendezvous and station keeping, datalinks, and specifically to using a datalink for precision rendezvous and station keeping.

Future uninhabited combat air vehicles (UCAVs) and other aircraft will require precise relative navigation capability to perform many mission functions. In most situations differential GPS techniques suitably augmented with inertial data will probably suffice for aircraft relative navigation. However the need to preserve aircraft operations in the case of denial of GPS implies that a self-contained relative navigation capability needs to be available, particularly in tactical operations. A specific example is automated refueling of UCAVs.

With piloted aircraft aerial refueling, relative navigation for the rendezvous is accomplished with TACAN and barometric altimeters. Fine navigation during connect, fueling, and disconnect is done visually by the pilot and tanker boom operator. For the rendezvous phase, the major problem with TACAN is that it is not a low-observable waveform. For the UCAV, precise, low-latency three-dimensional relative navigation is required throughout the entire capture/connect/fueling/disconnect process with the tanker boom operator having control over the UCAV at close range.

In a UCAV automated aerial refueling (AAR) system, coarse position reporting during rendezvous is sufficient. High accuracy is not required with standalone GPS positioning being adequate. For communications with the UCAV a low-observable communications datalink with long range is needed with a modest data rate being required such as less than a 1-Hz update rate and less than 20-kbps data rate. Networking must be flexible in the datalink communications system.

High-accuracy relative positioning is required during capture and refueling of the UCAV. A system wherein a tanker sends code and carrier measurements to the UCAV to compute a real-time relative navigation solution is needed. A 10-Hz update rate for GPS data and a 20-Hz rate for inertial navigation system (INS) data are required for real time control. A 60-kbps data rate is required with high integrity/reliability for data communications. A networked communications system with multiple UCAVs with varying update rates is desired.

The DARPA Tactical Targeting Network Technology (TTNT) datalink offers low-latency, high-bandwidth, and low-observable characteristics that are particularly well-suited to UCAV applications. The TTNT datalink may be used for relative navigation and may be applied to UCAV aerial refueling and station keeping. A TTNT-based three-dimensional relative navigation system is needed that also provides a backup for relative GPS and an integrity monitor for relative GPS. A system concept based on TTNT that can provide the necessary relative accuracy independent of external navigation signals is needed.

SUMMARY OF THE INVENTION

A relative navigation system for rendezvous and station keeping between a lead aircraft and follower aircraft is disclosed. A datalink on board the lead aircraft and the follower aircraft is used for transferring data link signals and for transmitting and receiving ranging messages therebetween. An antenna array and processing system on board the lead aircraft is used for azimuth and elevation determination of the follower aircraft.

The relative navigation system further comprises top and bottom lead aircraft fuselage antennas for transmitting and receiving data link signals and ranging messages at the lead aircraft. Top and bottom follower aircraft antennas for receiving and transmitting data link signals and ranging messages are included at the follower aircraft. An antenna array is mounted on the lead aircraft for receiving signals for azimuth and elevation determination.

The datalink is a frequency and time hopping data link capable of full-duplex transmission and reception of multiple data streams. The lead aircraft transmits a ranging message over the datalink to the follower aircraft and stores a lead aircraft time of transmit (TOT) time tag. The follower aircraft receives the ranging message and stores a follower time of reception (TOR) time tag. The follower aircraft transmits a ranging message over the datalink to the lead aircraft and stores a follower TOT time tag. The lead aircraft receives the ranging message and stores a lead TOR. The follower aircraft sends a data message with follower TOT and follower TOR to the lead aircraft. The lead aircraft determines relative range and time offsets using follower TOT/TOR in the data messages and stored lead TOT/TOR. The datalink may be a tactical targeting network technology (TTNT) datalink.

The antenna array system may comprise a monopulse antenna for providing a main beam pattern and azimuth and elevation patterns. A monopulse receiver has azimuth and elevation error channels that enable determination of azimuth and elevation angles to the follower aircraft.

It is an object of the present invention to provide a high-accuracy relative positioning navigation system required for precision rendezvous and station keeping.

It is an object of the present invention to use an existing Tactical Targeting Network Technology (TTNT) data link for ranging purposes.

It is an object of the present invention to use an antenna array system on board a lead aircraft for azimuth and elevation determination.

It is an advantage of the present invention to use existing communications equipment and antennas on board a lead aircraft and follower aircraft.

It is an advantage of the present invention to provide a backup for relative GPS navigation.

It is a feature of the present invention to provide an integrity monitor for relative GPS.

It is a feature of the present invention to provide ranging using the TTNT while minimizing impact to normal TTNT processing.

BRIEF DESCRIPTION OF THE DRAWINGS

The invention may be more fully understood by reading the following description of the preferred embodiments of the invention in conjunction with the appended drawings wherein.

DETAILED DESCRIPTION

The present invention is for a relative navigation system for precision rendezvous and station keeping that is based on two main system elements. Ranging is provided by two-way time transfer measurements between a lead aircraft such as an aerial tanker and a follower aircraft such as a UCAV using a datalink such as the DARPA Tactical Targeting Network Technology (TTNT) datalink. Relative azimuth and elevation angle measurements are obtained by processing measurements from an antenna array system.

While the present invention is described for application to a relative navigation system for guiding a UCAV to an aerial tanker for refueling operations, the relative navigation system may be used for aircraft other than aerial tankers and UCAVs and for purposes other than for aerial refueling where such relative positioning and navigation is required. An example is station keeping in a formation of aircraft in trailing flight. In addition, data links other than TTNT may be used that have similar operational characteristics.

Figure 1:
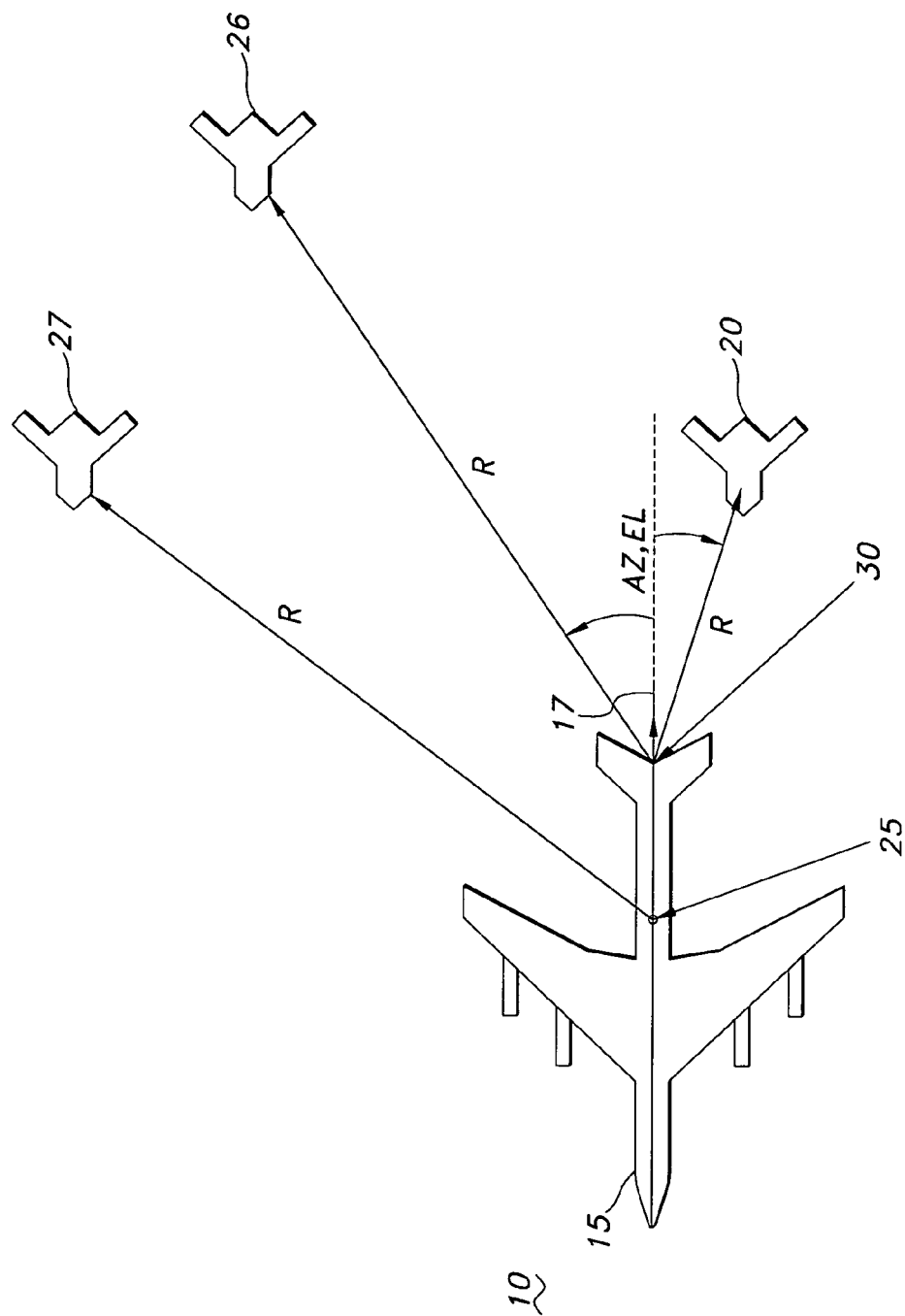
FIG. 1 is a diagram shown a Tactical Targeting Network Technology (TTNT) automated serial refueling uninhabited combat air vehicle (UCAV) relative navigation system concept of the present invention.

The relative navigation system concept for precision rendezvous and station keeping using data link signals of the present invention 10 is illustrated in FIG. 1 as implemented in an automated aerial refueling (AAR) system. Top and bottom fuselage antennas 25 on a tanker aircraft 15 (lead aircraft) permit communications and ranging to UCAVs 20, 26 and 27 (follower aircraft) at long ranges and in any direction. An antenna array 30 is mounted at or near the tail of the tanker aircraft 15, in the vicinity of a refueling boom 17 to optimize the coverage and accuracy for the UCAV 20 actively being refueled. In addition, communications and ranging to UCAVs 26 and 27 outside the coverage of the antenna array 30 can be accomplished by TTNT radios using existing Link-16 antennas 25 on the top and bottom the aircraft 15.

Figure 2:
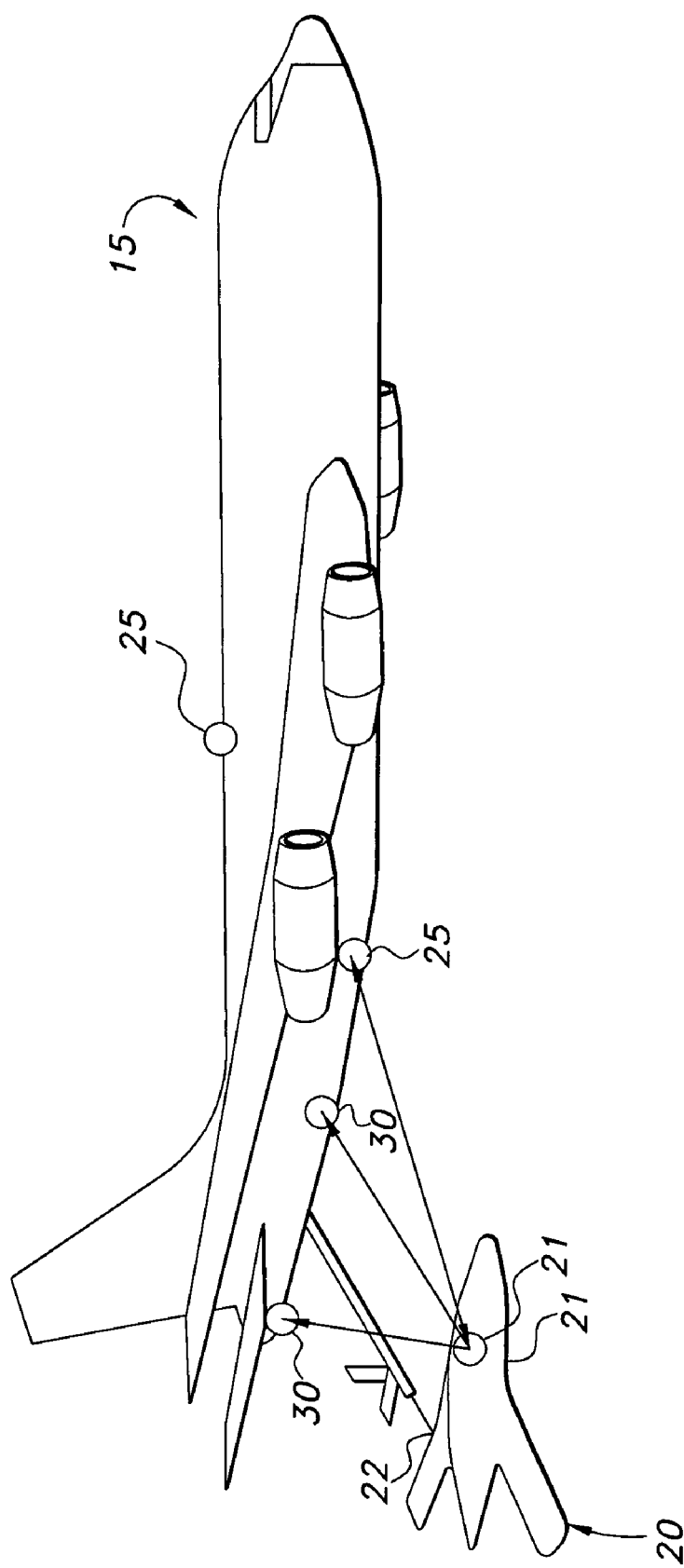
FIG. 2 is an additional view of automate aerial refueling geometry and antenna locations.

FIG. 2 is an additional view of AAR system geometry and antenna locations. The UCAV 20 may have antennas 21 located at top and bottom for TTNT data link reception. The UCAV 20 may have a refueling receptacle 22 on a left wing as shown in FIG. 2. The tanker L-band combo antennas 25 are located on top and bottom of the tanker 15. Possible tanker antenna array 30 locations may be in or near the tail of the tanker 15. Unobstructed ranging and angle of arrival measurements are possible.

TTNT is a high-speed, dynamic ad hoc network designed to assist the U.S. miliary in creating a rapid targeting capability critical across vital military operations. TTNT supports more than 200 users for secure jam-resistant transmission. The TTNT system is capable of simultaneous transmit and receive with no hold-off time and no preplanning. TTNT operates in full-duplex transmit and receive with four-channel simultaneous reception. TTNT network formation is simple, with automatic network organization and key exchanges performed anytime, even enroute. The secure TTNT network coexists with fielded technologies including Link-16 and is interoperable with the Wideband Networking Waveform (WNW) at the baseband network layer. The high-speed TTNT network enables net-centric sensor technologies to correlate data among multiple platforms by precisely geo-locating time-critical targets.

Figure 3:
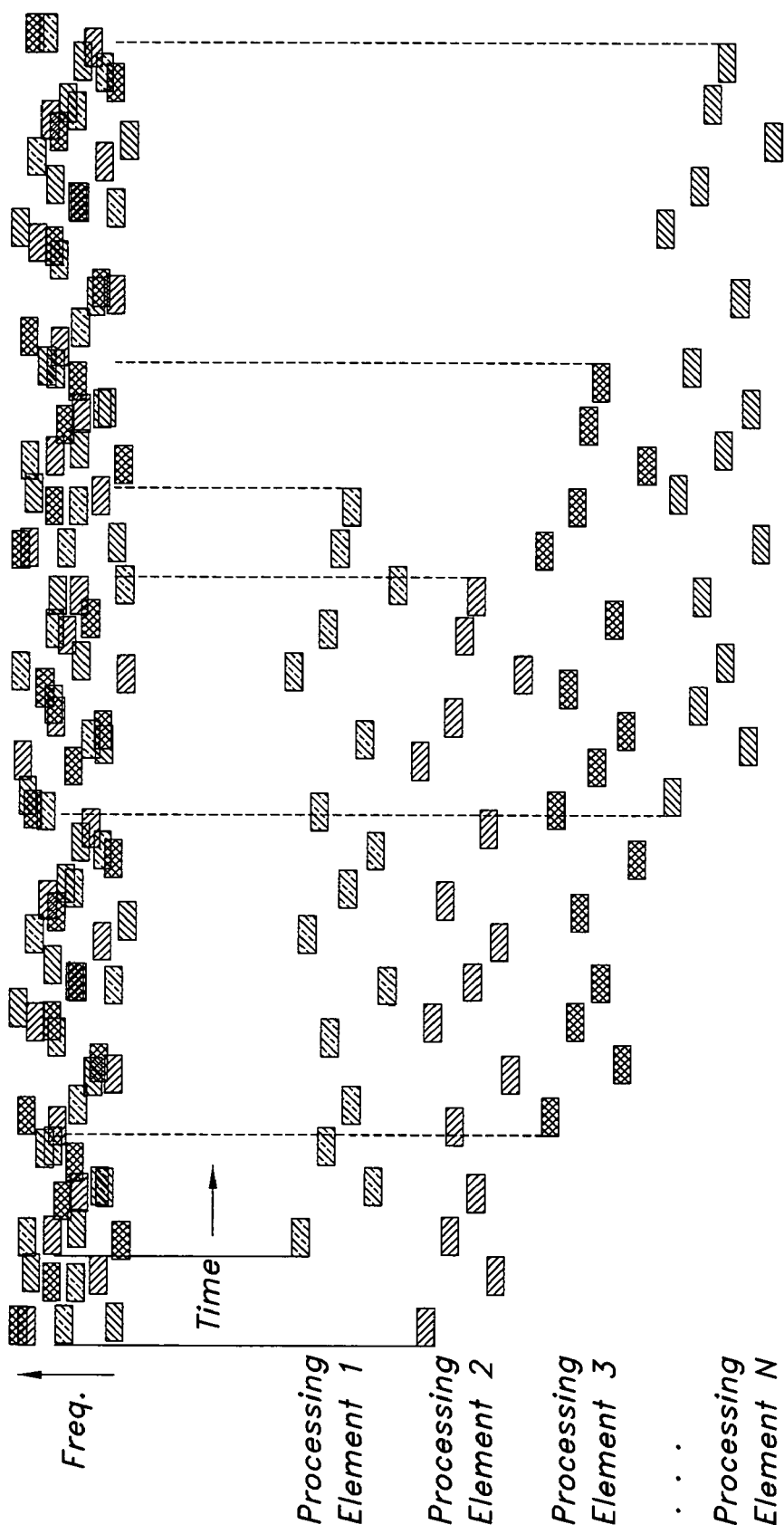
FIG. 3 shows frequency and time hopped waveforms of a TTNT data link.

The TTNT waveform is frequency hopped and time hopped with jitter and operates in upper L-band with no impact to Link-16. Co-pending application Ser. No. 10/217,731 entitled "Waveform for Virtually Simultaneous Transmission and Multiple Receptions System and Method" by Scott J. Zogg, Stephen M. Clark, Richard S. Haendel, Ronald R. Meyer, and Brain L. Aanderud, and incorporated by reference herein, describes the TTNT waveform. FIG. 3 shows multi-stream correlation and reception in the TTNT datalink. Multiple streams arrive with unique frequency hopping patterns at different times at a node in the datalink as shown at the top of FIG. 3. The bottom of FIG. 3 shows what packets are destined for different processing elements from the multiple streams from different sources. For example processing element 1 receives the cross hatched packets at differing frequencies and arrival times than other processing elements thereby enabling receiving of multiple packet streams at a receiver capable of processing such multiple streams.

Each TTNT user is capable of operation at 2-Mbps transmit and 10-Mbps receive. Communications ranges to 100 miles at 2 Mbps and 300 miles at 250 kbps are provided. A transmit power control algorithm is built in.

TTNT is a fully connected network with a subgroup relay built in. No network pre-planing is required for a mission. Broadcast, multi-cast and point-to-point service are provided to the application. Network security is provided by authentication, message security (MSEC) key distribution, and multiple independent levels of security (MILS). TTNT offers five-second network ingress with quality of service and class of service attributes built in. The TTNT system offers 1.7-ms transaction latency. The number of users is limited by channel capacity and not networking. The TTNT address space allows greater than 65,000 users to be supported.

Figure 4:
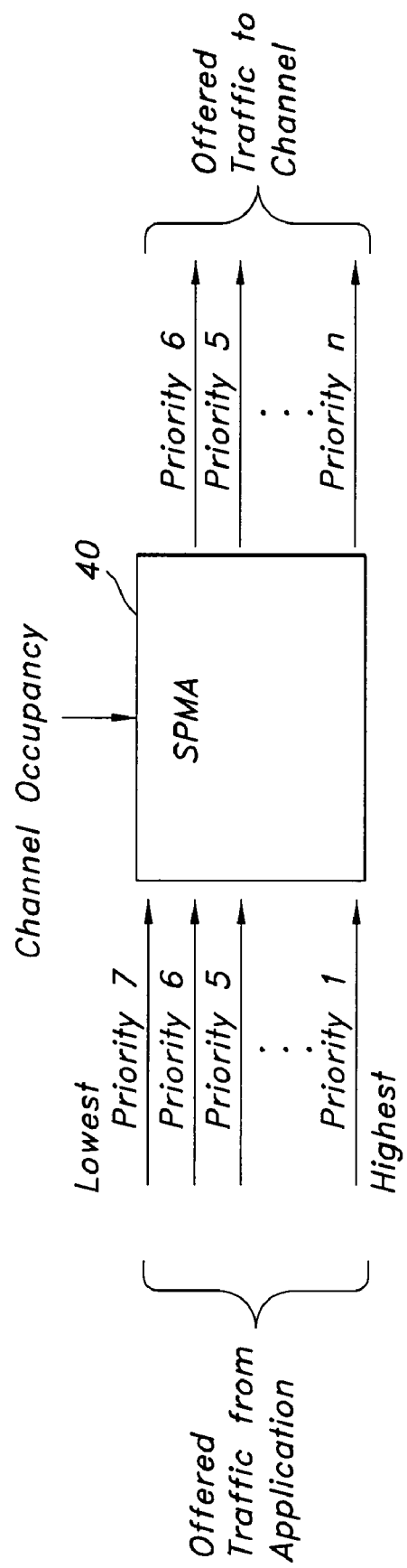
FIG. 4 is a diagram illustrating statistical priority-based multiple access (SPMA) system operation used in TTNT.

Stable distributed link control uses statistical priority-based multiple access (SPMA) as described in co-pending application Ser. No. 10/210,648 filed on Jul. 31, 2002 entitled "Statistical Priority-Based Multiple Access System and Method" by Stephen M. Clark, Kelli A. Hoback, and Scott J. F. Zogg. FIG. 4 shows SPMA operation of the TTNT datalink. In FIG. 4 offered traffic from an application is prioritized and processed in a SPMA function 40. The SPMA function 40 selects traffic according to channel occupancy statistics and offers the selected traffic to the communications channel. Immediate transmission is allowed when channel condition permit. TTNT affords stability by controlling the quantity of traffic offered to the channel. Graceful degradation occurs with escalating network traffic by dropping low-priority traffic as the load from applications increases. Throughput is preserved for higher priority traffic. TTNT eliminates complexity and traffic overhead associated with dynamic time division multiple access (TDMA).

TTNT offers many features that are applicable to precision rendezvous and station keeping. As described above, TTNT is a networked communication system with high data rates, low-latency, ad hoc networking, and anti-jam performance communications. The high-bandwidth signal enables accurate ranging with precise time of arrival (TOA) measurements for relative navigation. Two-millisecond latency for short low-latency messages allows for high-bandwidth inner loop flight control if needed. Ad hoc connectivity does not require mission planning for communications as it does for Link-16. Network entry of less than five seconds provides for rapid connectivity to closing UCAV platforms 20, 26 and 27. Over-the-air keying and authentication provides for easier UCAV 20, 26 and 27 mission planning since there are no crypto loads. The large address space provides for greatly increased network flexibility. Simultaneous message reception provides for listening to several UCAVs 20, 26 and 27 at once. Low-observable waveform characteristics make tanker aircraft location more difficult to determine. Using TTNT minimizes additional systems and antennas that must be deployed on UCAVs 20, 26 and 27.

The TTNT waveform has a high bandwidth that enables accurate two-way time transfer ranging. The ranging capability serves as a partial backup and monitor to GPS relative positioning. This is required since there is a possible denial of GPS such as poor GPS visibility due to tanker 15 blockage. TTNT ranging with an antenna array 30 on the tanker 15 provides for full three-dimensional relative navigation allowing a fully redundant back up and integrity monitor for a relative GPS solution.

With the absence of GPS, position reporting of inertial navigation system (INS) position data from the UCAV 20 to the tanker 15 over TTNT or other links is adequate to get the UCAV 20 to the correct initial intercept area twenty or more miles from the tanker 15. At this point, TTNT three-dimensional relative positioning can be used for guidance of the UCAV 20 to the proper contact point. Details of the elements in the system concept and the expected performance of the present invention are discussed below.

Ranging with TTNT uses a two-way time transfer technique. This technique is more flexible than a DME (distance measuring equipment)-like implementation, since no fixed modem delay is needed. The ranging measurements are derived from the message synchronization preamble, or a special ranging message may be utilized. A modem determines time of reception (TOR). A time of transmit (TOT) tag and other data such as node addresses and message identification are included in normal TTNT messages. Associated data and ranging messages with ID bits are transmitted. TOR and TOT are shared between UCAV 20 and the tanker 15 for relative range determination.

Figure 5:
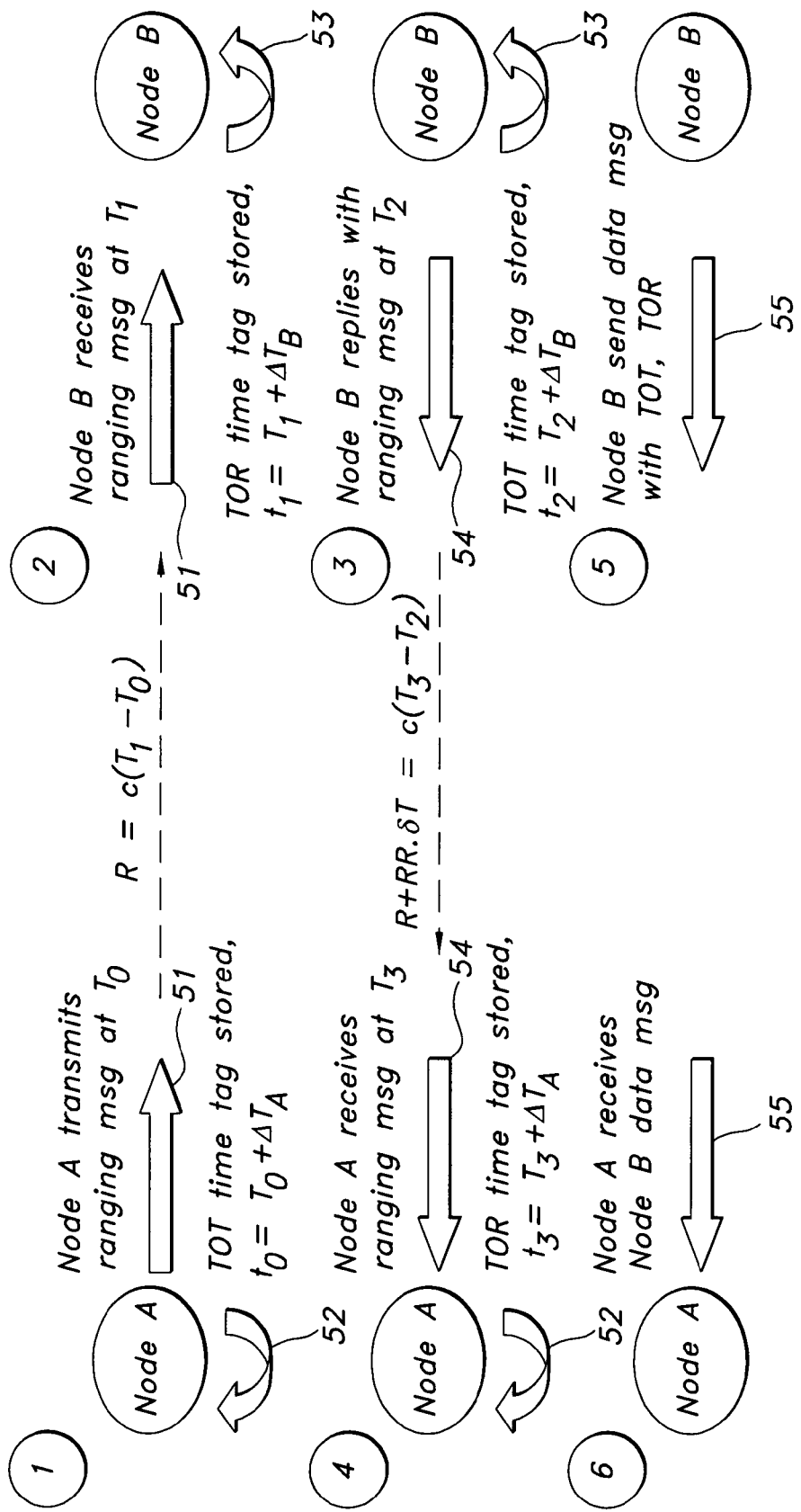
FIG. 5 shows data link ranging time transfer processing of the present invention.

FIG. 5 shows data link ranging time transfer processing of the present invention. In step 1 node A, which may be the tanker aircraft 15 or other lead aircraft, transmits a first ranging message at network time $T_0$ as shown by a ranging message arrow 51. Node A may also be the UCAV 20 or other follower aircraft since the time transfer processing of the present invention is bidirectional. Within node A, a node A time of transmit (TOT) time tag is stored as shown by an arrow 52 indicating internal data flow in node A with $$t_0 = T_0 + \Delta T_A$$

where
$t_0$=node A time of transmit time tag in node A time
$T_0$=time of transmit in network time
$\Delta T_A$=node A time error with respect to network time.

In step 2 node B, which may be the UCAV 20 (or the tanker aircraft 15 when the time transfer processing is in the reverse direction), receives the first ranging message 51 at network time $T_1$, and the range between node A and B is $$R = c(T_1 - T_0)$$

where
c=speed of light.

A TOR time tag is stored by node B as indicated by an arrow 53 indicating internal data flow in node B with $$t_1 = T_1 + \Delta T_B$$

where
$t_1$=node B time of reception time tag in node B time
$T_1$=time of reception
$\Delta T_B$=node B time error with respect to network time.

At step 3 node B replies with a second ranging message 54 at $T_2$. A node B TOT time tag is stored in node B with $$t_2 = T_2 + \Delta T_B$$

where
$t_2$=node B time of transmit time tag
$T_2$=time of transmit
$\Delta T_B$=node B time error with respect to network time.

At step 4 node A receives the second ranging message 54 at time $T_3$, and the range between node A and B is $$R + (RR) \cdot \delta T = c(T_3 - T_2)$$

where
c=speed of light
RR=range rate
$\delta T$=processing time delay $(T_2 - T_1)$.

At node A, a TOR time tag is stored as indicated by the arrow 52 indicating internal data flow with $$t_3 = T_3 + \Delta T_A$$

where
$t_3$=node A time of reception time tag in node A time
$T_3$=time of reception in network time
$\Delta T_A$=node A time error in network time.

Step 5 shows node B sending a standard data message 55 with TOT and TOR included. Step 6 shows node A receiving the standard data message 55 from node B. Node A then determines relative range and time offset using TOT/TOR time differences.

For many applications like AAR, $(RR) \cdot \delta T$ will be small and can be neglected. In this case a set of simultaneous linear equations can be formed that permits the relative range, R, to be determined as $$R = (c/2)[(t_3 - t_2) + (t_1 - t_0)]$$

and the relative time error of nodes A and B to be determined as $$\Delta T_B - \Delta T_A = \tfrac{1}{2}[(t_1 - t_0) - (t_3 - t_2)].$$

When $(RR) \cdot \delta T$ is not negligible, then relative velocity information, such as from inertial navigation units, can be employed to permit a solution.

Figure 6:
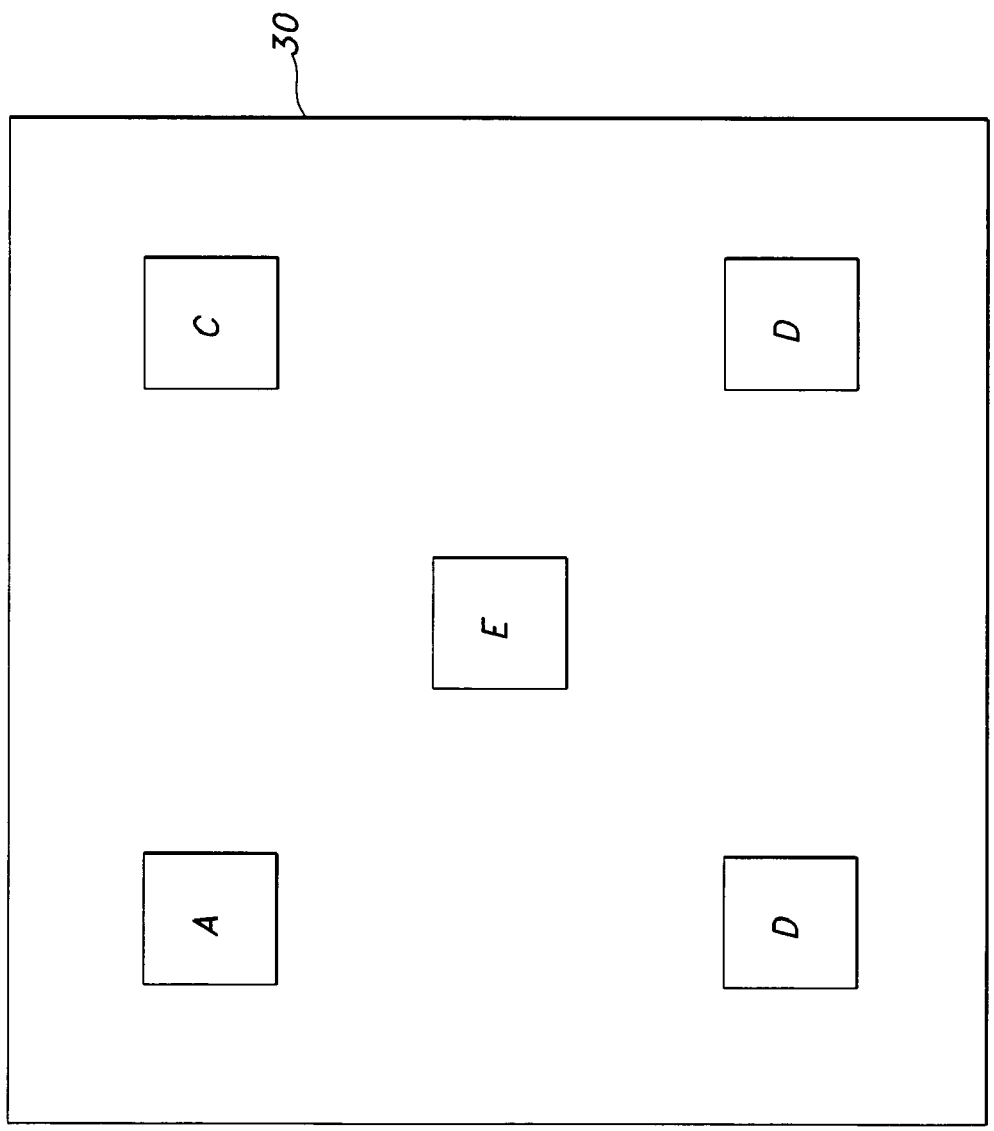
FIG. 6 illustrates an antenna array with patches that may be used in the present invention.

The antenna array 30 may be used with a digital processing system that analyzes signals from antenna elements in the antenna array 30 to determine azimuth and elevation. The antenna array 30 may be a phased array or a monopulse antenna with a digital processing system. In a monopulse system an antenna utilizes multiple elements sectioned into quartiles to provides a main beam pattern as well as azimuth and elevation error patterns. The multiple elements may be formed from a variety of types including feed patches, waveguide radiators, etc. FIG. 6 shows a monopulse antenna 30 formed from four antenna feed patches A, B, C, and D disposed as shown in quartiles with a calibration patch E. In reception three signals are received comprising the sum of A+B+C+D, a vertical difference (A+C)−(B+D), and a horizontal difference (A+B)−(C+D). Each of the four feed patches produces a slightly different reception pattern from the antenna array 30 so that in reception four individual patterns are centered in the direction a beam would have from a single feed placed at the center of the antenna array 30. No difference in the received signal occurs if a target is centered in the axial direction of the antenna. Any deviation from the center by the target results in a vertical difference signal, a horizontal difference signal or both. Three receivers are used to receive the sum signal, the horizontal difference or azimuth (AZ) signal, and the vertical difference or elevation (EL) signal.

The proposed navigation concept of the present invention utilizes an antenna array system such as a monopulse system add-on to the TTNT system to provide angular error information in addition to ranging. The antenna array 30 that meets the UCAV aerial refueling application can be constructed using the four feed patches A, B, C, and D as well as the calibration patch E symmetrically arranged in an 18×18 cm square.

Figure 7:
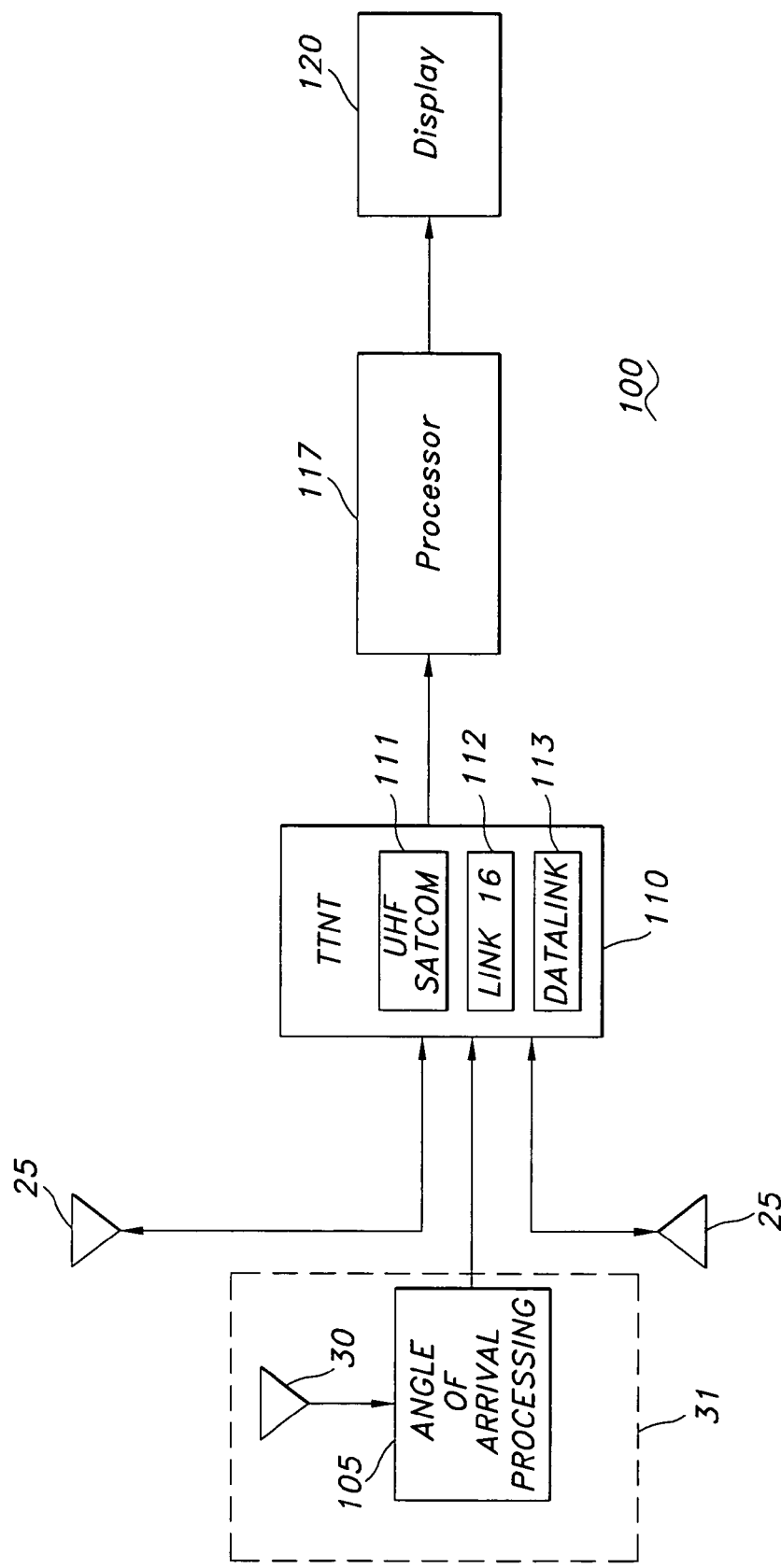
FIG. 7 shows a TTNT communications/GPS system with automated aerial refueling navigation capabilities of the present invention.

A TTNT communications system 100 incorporating the relative navigation system of the present invention is shown in block diagram form in FIG. 7. Included in the system 100 is the antenna array 30 connected to an angle of arrival processing function 105 to form an antenna array and processing system 31 for determination of azimuth and elevation. The output of the angle of arrival processing function 105 is connected to the TTNT datalink module 110. Upper and lower L-band antennas 25 are used for datalink communications and are connected to TTNT datalink module 110. Communications equipment in the TTNT datalink module 110 includes UHF SATCOM 111, Link-16 112, and TTNT datalink 113. Azimuth and elevation signals from the angle of arrival processing function 105 and timing signals received over the TTNT datalink 113 are passed to a processor 117 where the relative navigation solution is processed. Display unit 120 is used for displaying TTNT datalink 113, UHF STACOM 111, Link-16 112, and relative navigation data.

Figure 8:
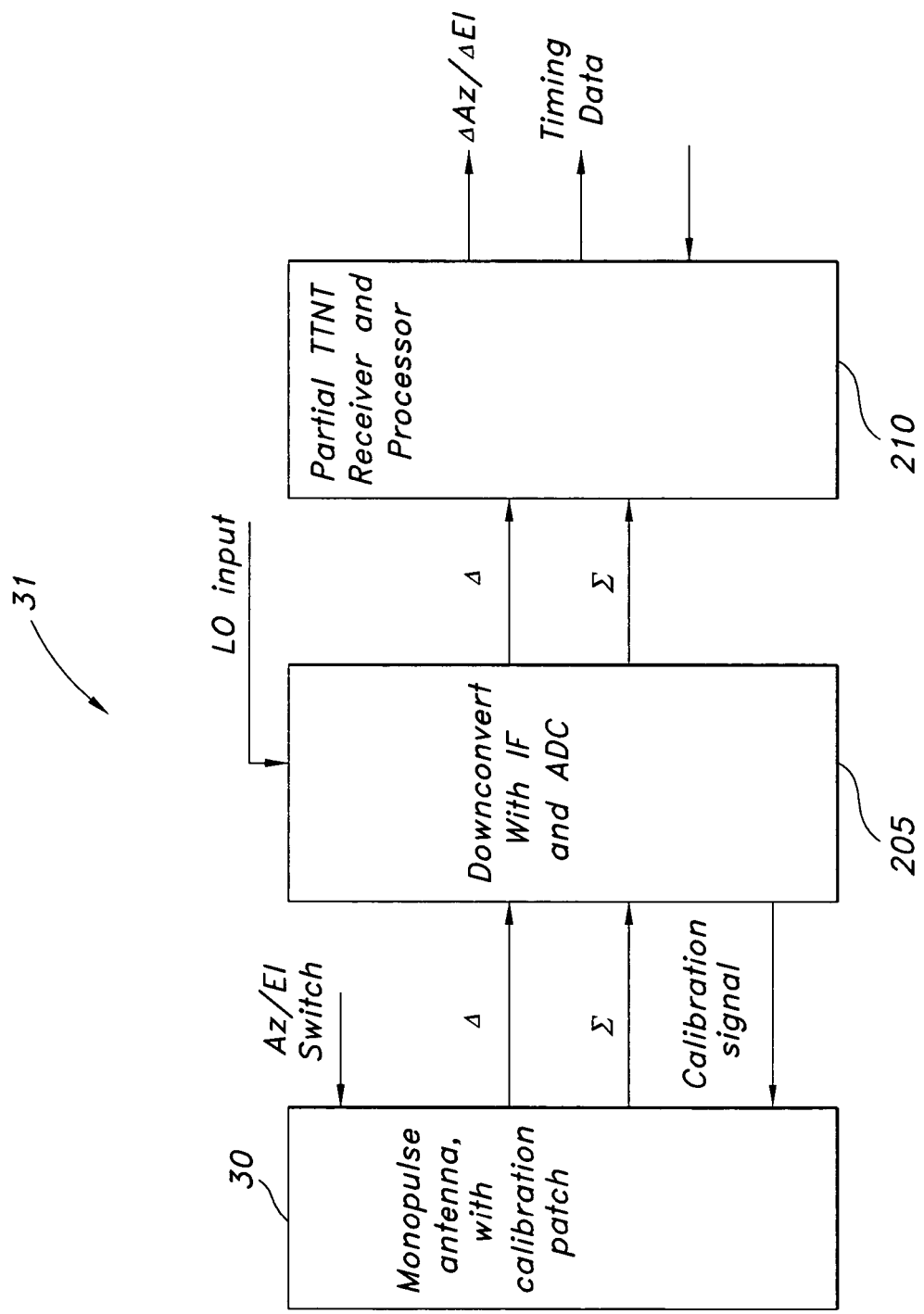
FIG. 8 shows an antenna array and processing system using a special two-channel receiver derived from TTNT modules used for angle of arrival processing to process azimuth/elevation signals.

FIG. 8 shows the antenna array and processing system 31 as an example two-channel receiver derived from TTNT modules. The TTNT modules are used for the angle of arrival processing function 105 to FIG. 7 to determine azimuth and elevation angles to the follower aircraft. The antenna array 30 has a calibration patch to calibrate out phase differences between sum and difference channels than arrive due to environmental effects including temperature variations. An azimuth/elevation switch located in the antenna array 30, switches between azimuth and elevation ports on a hybrid combiner (not shown) to allow sharing of a single receiver channel for angle processing. The sum ($\Sigma$) and difference ($\Delta$) channel outputs are fed to a down conversion stage 205 with dual IF stages and associated analog-to-digital converter (ADC). The digitized $\Sigma\Delta$ outputs (AZ/EL) are fed to a partial TTNT receiver and processor 210. The partial TTNT receiver/processor 210 provides a $\Delta AZ/\Delta EL$ output to the processor 117 along with timing data.

The proposed relative navigation architecture based on TTNT two-way timing ranging technology is able to meet the needs of UCAV aerial refueling and station keeping. The main features of the proposed system include: precise relative ranging with the TTNT datalink waveform; antenna array angle measurements on the tanker to provide 3D relative positioning for aerial refueling.

TTNT can provide a flexible and robust networked communications solution for the UCAV AAR application. TTNT offers low latency and high bandwidth for relative navigation. TTNT ad hoc networking is capable of supporting many users. TTNT ranging with the antenna array system can provide a backup/integrity monitor for GPS relative positioning. The high bandwidth of TTNT provides excellent time of arrival measurements. A simple monopulse design can satisfy both beamwidth and accuracy requirements. TTNT can provide all UCAV wide band networked communications.

It is believed that the relative navigation for precision rendezvous and station keeping using datalink signals of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A relative navigation system for rendezvous and station keeping between a lead aircraft and a follower aircraft, said navigation system comprising:
   a datalink on board the lead aircraft and the follower aircraft for transferring data link signals and for transmitting and receiving ranging messages therebetween;
   an antenna array and processing system on board the lead aircraft for azimuth and elevation determination of the follower aircraft;
   wherein the antenna array and processing system comprises:
   a monopulse antenna for receiving follower aircraft transmissions and providing a main beam pattern and azimuth and elevation patterns; and
   a monopulse receiver for determining azimuth and elevation angles to the follower aircraft.

2. A method of guiding the follower aircraft to the lead aircraft for refueling with a precision rendezvous and station keeping relative navigation system, comprising the steps of:
   transferring data link signals between the lead aircraft and the follower aircraft over a datalink;
   determining a range between the follower aircraft and the lead aircraft with the datalink on board the lead and follower aircraft using ranging messages;
   determining azimuth and elevation of the follower aircraft using an antenna array and processing system on board the lead aircraft;
   wherein the antenna array and processing system performs the steps of:
   receiving follower aircraft transmission with a monopulse antenna; and
   determining azimuth and elevation angles to the follower aircraft in a monopulse receiver.

3. A method for guiding a follower aircraft to a lead aircraft using a relative navigation system comprising a datalink on board the follower aircraft and the lead aircraft for transferring data and for determining a range between the follower aircraft and the lead aircraft, said relative navigation system further comprising a monopulse antenna system on board the lead aircraft for determining azimuth and elevation of the follower aircraft, said datalink further performing the steps of:

transmitting a first ranging message from the lead aircraft to the follower aircraft;

storing a lead aircraft time of transmit (TOT) time tag at the lead aircraft;

receiving the first ranging message at the follower aircraft;

storing a follower aircraft time of reception (TOR) time tag at the follower aircraft;

transmitting a second ranging message from the follower aircraft to the lead aircraft;

storing a follower aircraft TOT time tag at the follower aircraft;

receiving the second ranging message at the lead aircraft;

storing a lead aircraft TOR at the lead aircraft;

sending a data message from the follower aircraft to the lead aircraft with follower aircraft TOT and TOR; and determining relative range and time offsets using follower aircraft TOT/TOR in the data message and stored lead aircraft TOT/TOR.

\* \* \* \* \*